(12) United States Patent
Dinn et al.

(10) Patent No.: US 8,639,827 B1
(45) Date of Patent: Jan. 28, 2014

(54) SELF-SERVICE SYSTEMS AND METHODS FOR GRANTING ACCESS TO RESOURCES

(75) Inventors: Stephen Brian Dinn, Halifax (CA); Ian Murray Frosst, South Rawdon (CA)

(73) Assignee: Dell Software Inc., Aliso Viejo, CA (US)

( * ) Notice: Subject to any disclaimer, the term of this patent is extended or adjusted under 35 U.S.C. 154(b) by 351 days.

(21) Appl. No.: 13/092,051

(22) Filed: Apr. 21, 2011

Related U.S. Application Data (60) Provisional application No. 61/327,550, filed on Apr. 23, 2010.

(51) Int. Cl.
*G06F 15/16* (2006.01)

(52) U.S. Cl.
USPC ............................ 709/229; 709/225; 709/217

(58) Field of Classification Search
USPC ......................................... 709/229, 225, 217
See application file for complete search history.

(56) References Cited

U.S. PATENT DOCUMENTS

| | | | |
|---|---|---|---|
| 5,911,143 A | 6/1999 | Deinhart et al. | |
| 6,038,677 A | 3/2000 | Lawlor et al. | |
| 6,088,679 A | 7/2000 | Barkley | |
| 6,275,825 B1 | 8/2001 | Kobayashi et al. | |
| 6,499,031 B1 | 12/2002 | Hopmann et al. | |
| 6,665,714 B1 | 12/2003 | Blumenau et al. | |
| 6,978,381 B1 | 12/2005 | Te et al. | |
| 7,574,734 B2 | 8/2009 | Fedronic et al. | |
| 7,703,135 B2 | 4/2010 | Bender et al. | |
| 8,326,874 B2 * | 12/2012 | Wright et al. | 707/783 |
| 8,387,136 B2 * | 2/2013 | Lee et al. | 726/20 |
| 2002/0026592 A1 | 2/2002 | Gavrila et al. | |
| 2002/0188597 A1 | 12/2002 | Kern et al. | |

(Continued)

FOREIGN PATENT DOCUMENTS

JP 11-194974 7/1999

OTHER PUBLICATIONS

Access Control List, http://en.wikipedia.org, dated Mar. 24, 2011.
Active Directory, http://en.wikipedia.org, dated Mar. 24, 2011.
Security Identifier, http://en.wikipedia.org, dated Mar. 24, 2011.
Microsoft Technet, Best Practices for Assigning Permissions on Active Directory Objects, updated Jan. 21, 2005, http://technet.microsoft.com/en-us/library/cc786285(v=ws.10).aspx 3 pages.
Microsoft Technet, Active Directory Users, Computers, and Groups, printed Jan. 25, 2011, http://technet.microsoftcom/en-us/library/bb727067(printer).aspx 21 pages.

(Continued)

*Primary Examiner* — Kevin Bates
(74) *Attorney, Agent, or Firm* — Winstead PC (57) ABSTRACT

A self-service system is provided that can automatically identify one or more existing groups to which a user can self-select to access a resource. The self-service system can identify any suitable existing group without requiring an administrator to predefine groups according to roles. In some implementations, the system intelligently identifies one or more suitable groups for a user from a list of available groups by analyzing a set of rules or criteria. For instance, the system can perform a weighted analysis of various rules and/or criteria to automatically and dynamically identify groups that have a closest fit to the access rights needed or requested by the user. Further, the system can evaluate certain best or preferred grouping practices to identify suitable groups. As a result, in certain embodiments, the self-service system alleviates planning burdens on administrators and provides greater flexibility in providing users with access to resources.

18 Claims, 9 Drawing Sheets

(56) References Cited

U.S. PATENT DOCUMENTS

| | | |
|---|---|---|
| 2004/0243672 A1* | 12/2004 | Markki et al. ............... 709/204 |
| 2005/0210409 A1* | 9/2005 | Jou ............................. 715/811 |
| 2007/0088744 A1 | 4/2007 | Webber et al. |
| 2007/0244899 A1 | 10/2007 | Faitelson et al. |
| 2008/0155078 A1* | 6/2008 | Parkkinen et al. ............ 709/223 |
| 2009/0024741 A1* | 1/2009 | Roach .......................... 709/225 |
| 2009/0044011 A1 | 2/2009 | Russell et al. |
| 2010/0005514 A1 | 1/2010 | Chen |
| 2010/0005518 A1* | 1/2010 | Tirpak et al. ..................... 726/6 |
| 2010/0211989 A1 | 8/2010 | Julisch et al. |
| 2011/0264737 A1* | 10/2011 | Skinner ........................ 709/204 |
| 2013/0091280 A1* | 4/2013 | Rajakarunanayake et al. ............................. 709/225 |

* cited by examiner

SELF-SERVICE SYSTEMS AND METHODS FOR GRANTING ACCESS TO RESOURCES

RELATED APPLICATION

This application claims the benefit of priority under 35 U.S.C. §119(e) of U.S. Provisional Patent Application No. 61/327,550, filed on Apr. 23, 2010, entitled "Self-Service Systems and Methods for Granting Access to Resources," the disclosure of which is hereby incorporated by reference in its entirety.

BACKGROUND

One issue that often confronts system administrators is regulating user access to networked resources. Some examples of networked resources can include computing systems, peripherals (e.g., printers), documents, mailboxes, calendars, applications, folders, directories, files, and firewall services. Resource access regulation can be a monumental task in computer networks having thousands of users and even more resources. Even networks in a smaller organization may have many resources that can be difficult to manage access for as users needs change or as users leave or join the organization.

In general, there are two ways to grant a user access to a resource. First, a user can be granted direct access to the resource. Second, a user can be assigned to a group that has access to the particular resource. Groups can be collections of user accounts, computer accounts, and/or other group accounts. Granting access to users through groups is preferred because managing relatively few groups can be easier than managing relatively many individuals. Group access can be managed through a directory service, such as the Active Directory™ service provided by MICROSOFT.

In Active Directory, for example, three types of groups are available for granting users with access to resources. These groups include universal groups, global groups, and domain local groups. Universal groups can allow user membership across an Active Directory forest, which often includes most or all systems in an organization. Universal groups are often used by smaller organizations that have few users. Global groups, on the other hand, allow user membership from domains, which can be subunits in an organization. Domain local groups are often assigned permission to local resources, such as printers. In certain organizations, such as medium and larger organizations, group and domain local groups instead of universal groups are used to grant resource access. Typically, such access includes creating a domain local group and assigning it permission to access a resource, adding users to a global group, and then nesting (e.g., adding) this global group with the domain local group to grant those users access to the resource.

SUMMARY

In certain embodiments, a self-service system is provided that automatically identifies one or more existing groups to which a user can self-select to access a resource. The self-service system can identify any suitable existing group without requiring an administrator to predefine groups according to roles. In some implementations, the system intelligently identifies one or more suitable groups for a user from a list of available groups by analyzing a set of rules or criteria. For instance, the system can perform a weighted analysis of various rules and/or criteria to automatically and dynamically identify groups that have a closest fit to the access rights needed or requested by the user. Further, the system can evaluate certain best or preferred grouping practices to identify suitable groups. As a result, in certain embodiments, the self-service system alleviates planning burdens on administrators and provides greater flexibility in providing users with access to resources.

The systems and methods described herein can be implemented by a computer system comprising computer hardware. The computer system may include one or more physical computing devices, which may be geographically dispersed or co-located.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

FIGS. 4-8 illustrate embodiments of user interfaces associated with vehicle history displays that can be generated by the vehicle management system.

DETAILED DESCRIPTION

I. Introduction

In some existing systems, in order for a user to obtain access to a resource, the user must contact a manager or other administrator to request access. The manager or administrator then manually configures the access for the user by, for example, adding the user to a group that already has access to the identified resource. Self-service systems have therefore been developed to attempt to alleviate this manual process. These systems provide some automation to the user access workflow, allowing users to submit requests for access to resources and receive at least partially automatic grants of access rights.

A drawback to existing self-service systems is that administrators may need to perform a great deal of planning and configuration of user roles to enable users to obtain self-service access. In a typical self-service system, an administrator initially determines which user roles (such as accountant, programmer, etc.) should be granted access to which resource. The administrator then creates groups according to the roles. A user requesting access to a resource identifies his or her role to obtain access to a group that has access to that resource. However, roles-based self-service systems can be inflexible, denying access to users who do not fit in predefined roles or who need access to resources outside of his or her predefined role group.

This disclosure describes a self-service system that can automatically identify one or more existing groups to which a user can self-select to access a resource. Advantageously, in certain embodiments, the self-service system can identify any suitable existing group without requiring an administrator to predefine groups according to roles. In some implementations, the system intelligently identifies one or more suitable groups for a user from a list of available groups by analyzing a set of rules or criteria. For instance, the system can perform a weighted analysis of various rules and/or criteria to automatically and dynamically identify groups that have a closest fit to the access rights needed or requested by the user. Further, the system can evaluate certain best or preferred grouping practices to identify suitable groups. As a result, in certain embodiments, the self-service system alleviates planning burdens on administrators and provides greater flexibility in providing users with access to resources.

II. Example Self-Service System

Figure 1:
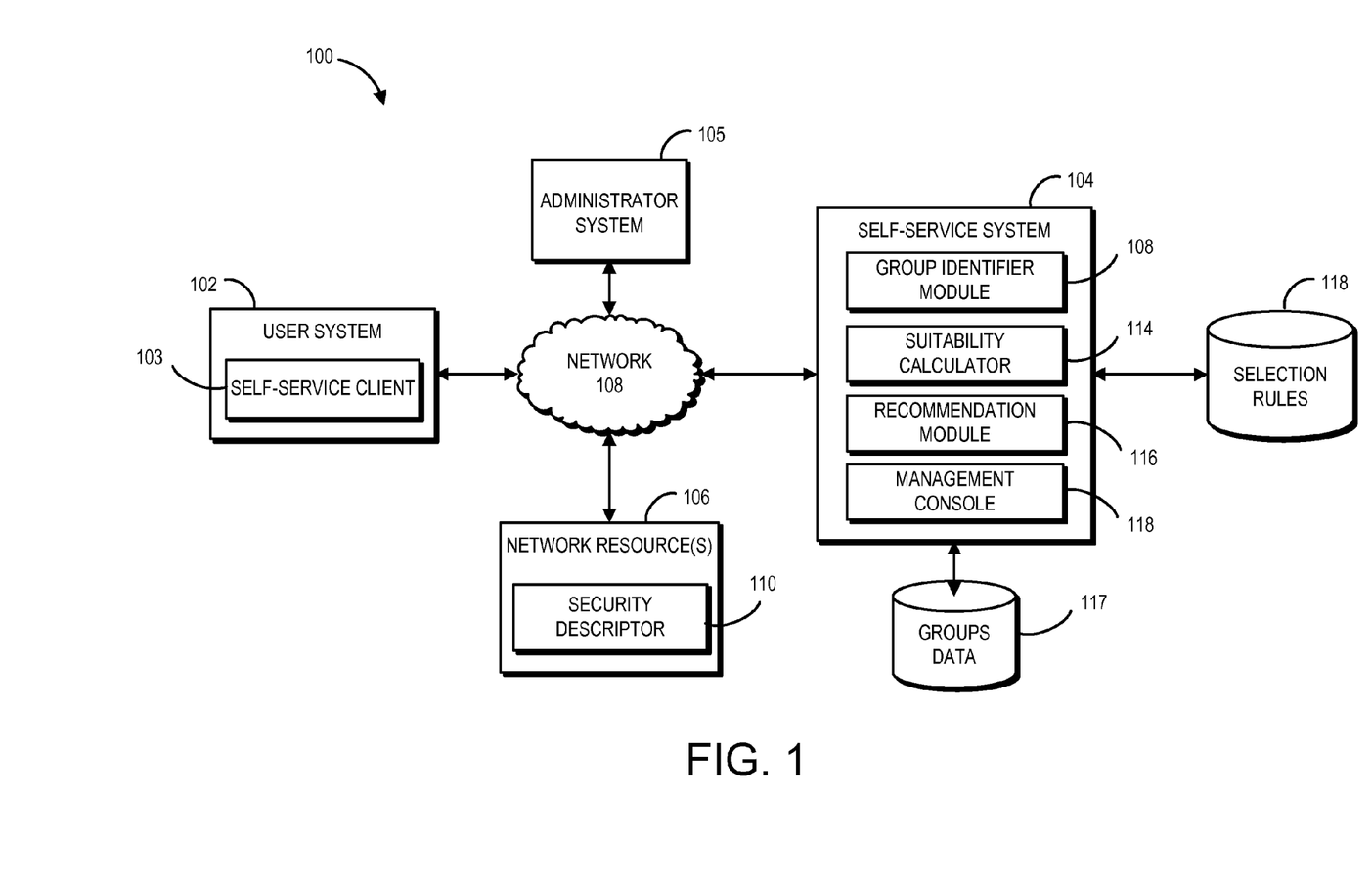
FIG. 1 illustrates an embodiment of a computing environment for providing users with access to a self-service system.

FIG. 1 illustrates an embodiment of a computing environment 100 that provides users with access to a self-service system 104 that facilitates obtaining access to one or more network resources. As shown, the computing environment 100 includes an example user system 102 that is accessible by one or more users and that communicates a user request to the self-service system 104 for access to at least one network resource 106. For example, in certain embodiments, a particular user may request read and/or write access to a stored document to which he or she does not initially have access. Other examples of network resources 106 include computing systems, peripherals (e.g., printers), documents, mailboxes, calendars, applications, folders, directories, files, and firewall services.

In general, the user system 102 can include any type of computing device capable of executing one or more applications and/or accessing network resources. In certain embodiments, the user system 102 includes a desktop, netbook, laptop, or tablet computer. In other embodiments, the user system 102 can include a smartphone, a workstation, a server, a PDA, or the like. The depicted user system 102 includes a self-service client 103 that includes software and/or hardware for sending resource access requests to the self-service system 104. An example user interface for the self-service client 103 is described below with respect to FIGS. 4 through 7B.

The self-service system 104 can execute on one or more computing devices, such as one or more physical server computers. In implementations where the self-service system 104 is implemented on multiple servers, these servers can be co-located or can be geographically separate (such as in separate data centers). In addition, the self-service system 104 can be implemented in a virtual server that runs on a physical server. The self-service system 104 can receive access requests from the self-service client 103 on the user system 102. In response to receiving an access request, the self-service system 104 can programmatically identify one or more groups to which the user can be assigned to obtain the requested access to the identified network resource(s) 106.

As further illustrated, components of the computing environment 100 can communicate with each other via a network 108, which can include a local area network (LAN), a wide area network (WAN), the Internet, or the like. For example, the network 108 can include an organization's private intranet or a combination of an intranet and the public Internet.

To identify pertinent groups, as will be described in more detail below with respect to FIGS. 2 and 3, the self-service system 104 can use a plurality of subcomponents or modules. Each of these modules can be implemented in hardware and/or software. For example, the illustrated self-service system 104 includes a group identifier module 108 that can identify one or more groups that have access to a resource 106. In one embodiment, the group identifier module 108 performs this identification by accessing a security descriptor 110 of the network resource(s) 106 to determine one or more groups that have been granted access to the network resource(s) 106. The group identifier module 108 can optionally identify which of these groups is available for the user to join, for example, by accessing a groups data repository 117 to determine which groups are public or published and therefore available to join. In one embodiment, these available groups are candidate groups that can be analyzed further for suitability.

It should be noted that the security descriptor 110 is shown in FIG. 1 attached to the associated network resource(s) 106 for ease of illustration and that other embodiments can include one or more security descriptors 110 at one or more locations remote to the resource 106. For example, the system 100 can include a central repository for security descriptors of various resources on the network.

The self-service system 104 further includes a suitability calculator 114 that examines the candidate groups for suitability. For instance, the suitability calculator 114 can use group selection rules (e.g., stored in a data repository 118) for intelligently and dynamically selecting which of the candidate groups are most suitable for providing the requested resource access to the user. In certain embodiments, the group selection rules can be weighted according to predetermined weights and/or administrator-adjustable weights.

Group selection rules are described in detail below with respect to FIG. 3. However, in general, the group selection rules can govern which groups are identified as suitable for a user requesting access based on such factors as closeness of fit to the requested access rights and other group characteristics, such as the type of a group, the nesting distance of a group from a resource, access inheritance of groups, group membership rules, and so forth. For instance, the more rights a particular group has when compared to the rights that were requested, the less desirable it may be for a user to be allowed to be a member of that group. The group selection rules can also reflect best or preferred grouping practices in one embodiment.

Figure 6:
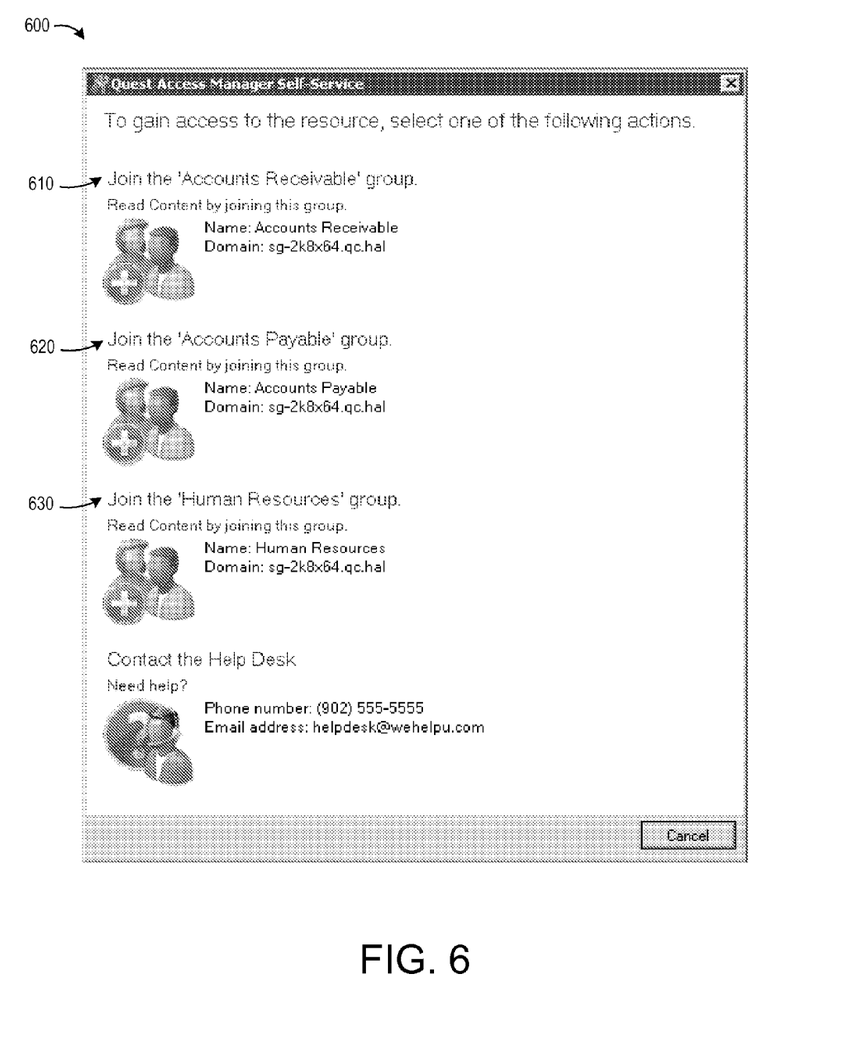

As shown, the self-service system 104 further includes a recommendation module 116 that, in certain embodiments, provides a recommendation to the user (or to a system administrator) of one or more groups to which the user can select or be assigned to achieve the requested access (see FIG. 6). In one embodiment, once a user selects a group to join (see FIGS. 7A and 7B), the user's selection is transmitted to an administrator of the group. The self-service system 104 further includes a management console 116 that provides a user interface for the administrator to manage such group access requests (see FIGS. 8 and 9).

It should be noted that while the functionality of the self-service system 104 is described with respect to groups in MICROSOFT'S Active Directory service, the self-service system 104 need not be used in conjunction with Active Directory. Instead, the self-service system 104 can be used in conjunction with other directory or access services, including services implemented in operating systems other than MICROSOFT WINDOWS.

III. Self-Service Process Overview

Figure 2A:
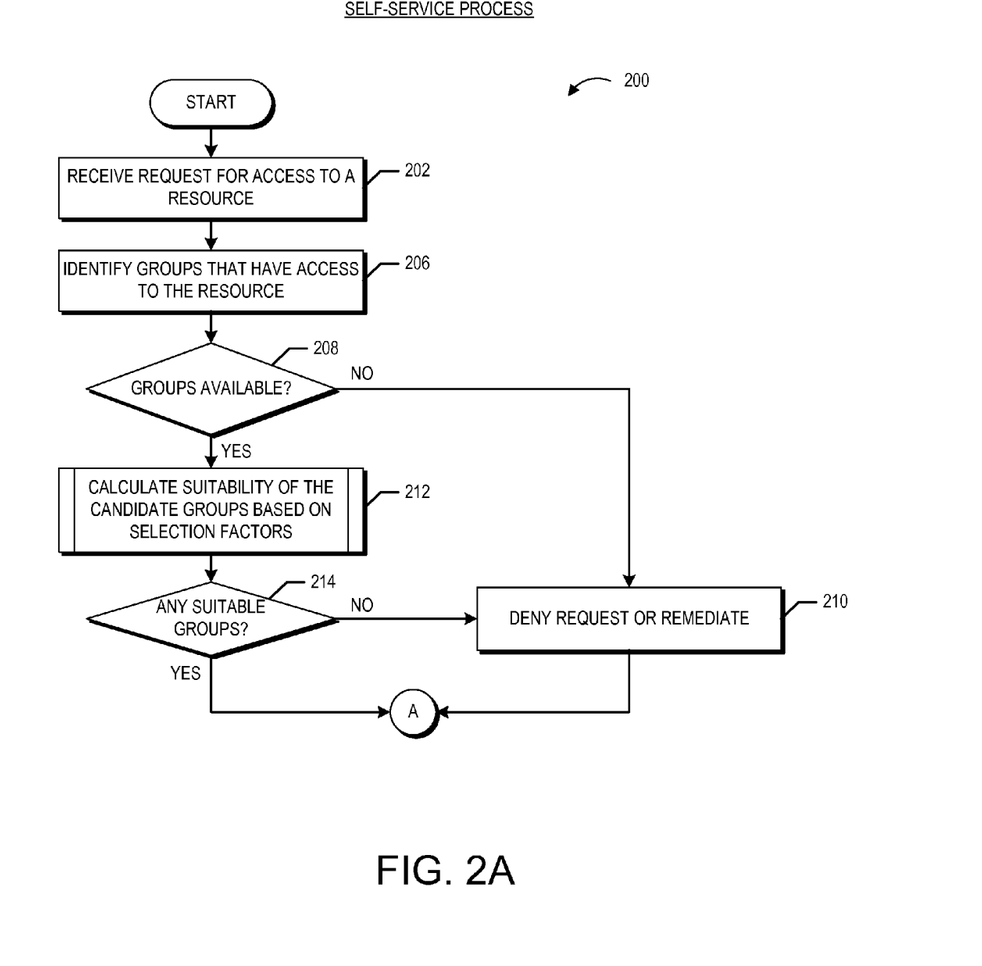
FIGS. 2A and 2B illustrate an embodiment of a self-service process that can be implemented by the self-service system of FIG. 1.
Figure 2B:
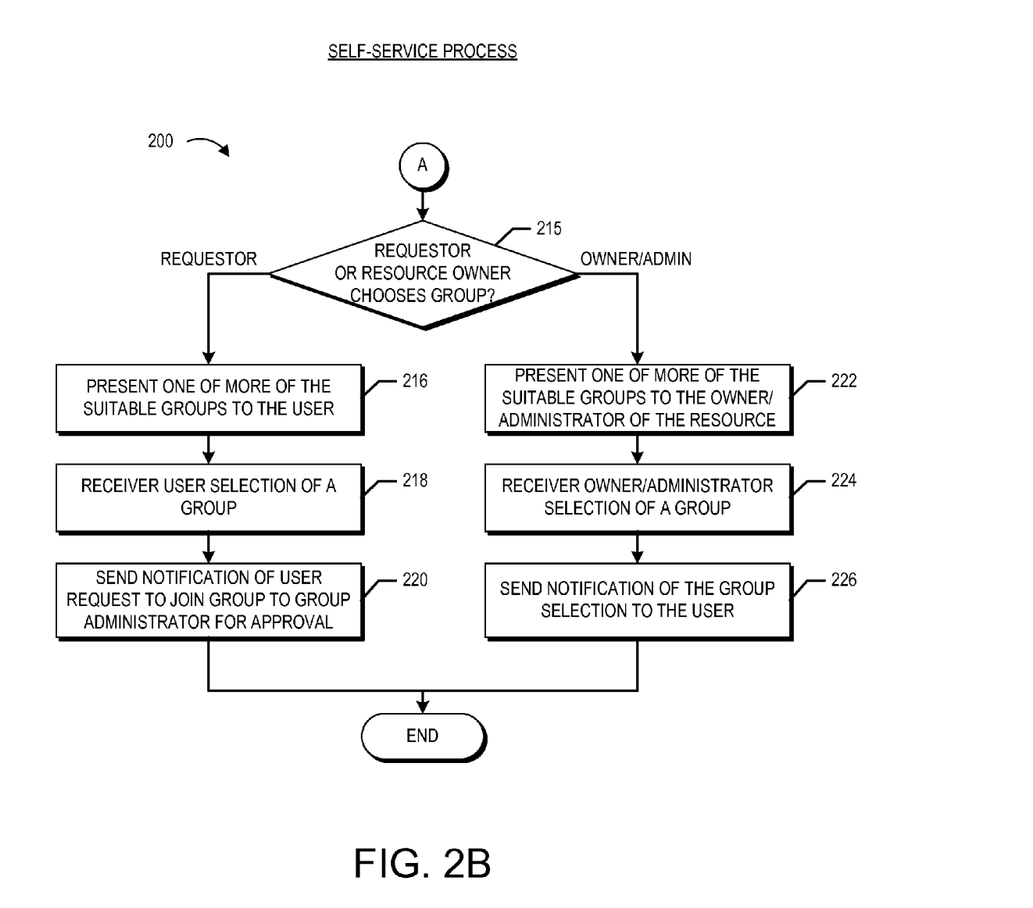

FIGS. 2A and 2B illustrate an overview of an example self-service process 200 for enabling a user to obtain self-service access to a resource. The process 200 is shown in two parts, with the process 200 commencing in FIG. 2A and completing in FIG. 2B. For illustrative purposes, the process 200 will be described with reference to the components of the computing environment 100 of FIG. 1. In addition, the process 200 will be described in conjunction with the user interfaces shown in FIGS. 4 through 8. Advantageously, in the depicted embodiment, the self-service process 200 automatically identifies suitable groups for a user to join to obtain access to a resource. Details on how suitable groups are identified are described more fully below with respect to FIG. 3.

Figure 4:
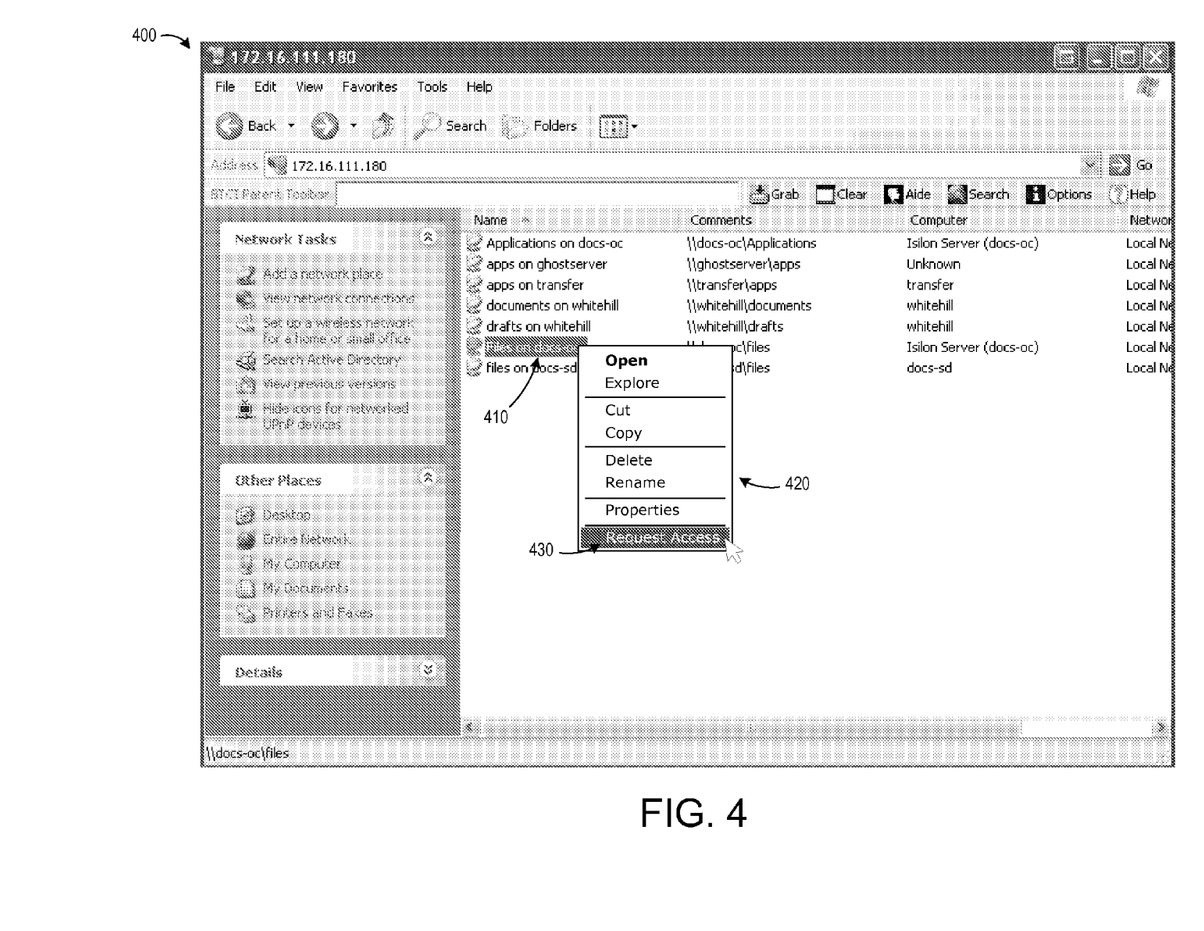

As shown in FIG. 2A, the process 200 begins at block 202, where a request for access to a resource is received by the self-service system 104. The request for access can be generated by a user of the user system 102 using the self-service client 103 and can include data representing the resource that access is requested for and optionally a level of access requested. In one embodiment, the self-service client 103 includes a component that listens for network resource selection events by the user. An example network resource selection event includes a left or right mouse click on a resource listed in a file system display. For instance, FIG. 4 illustrates an example file system user interface 400 where a user has right-clicked on a network resource 410, which is a folder in the depicted example. Upon right-clicking, a context menu 420 is displayed, which includes a "request access" menu item 430. The self-service client 103 can insert this request access menu item 430 in the context menu 420 upon detecting the right-click event. User selection of the request access menu item 430 can enable the user to obtain self-service access to the resource 410.

Figure 5:
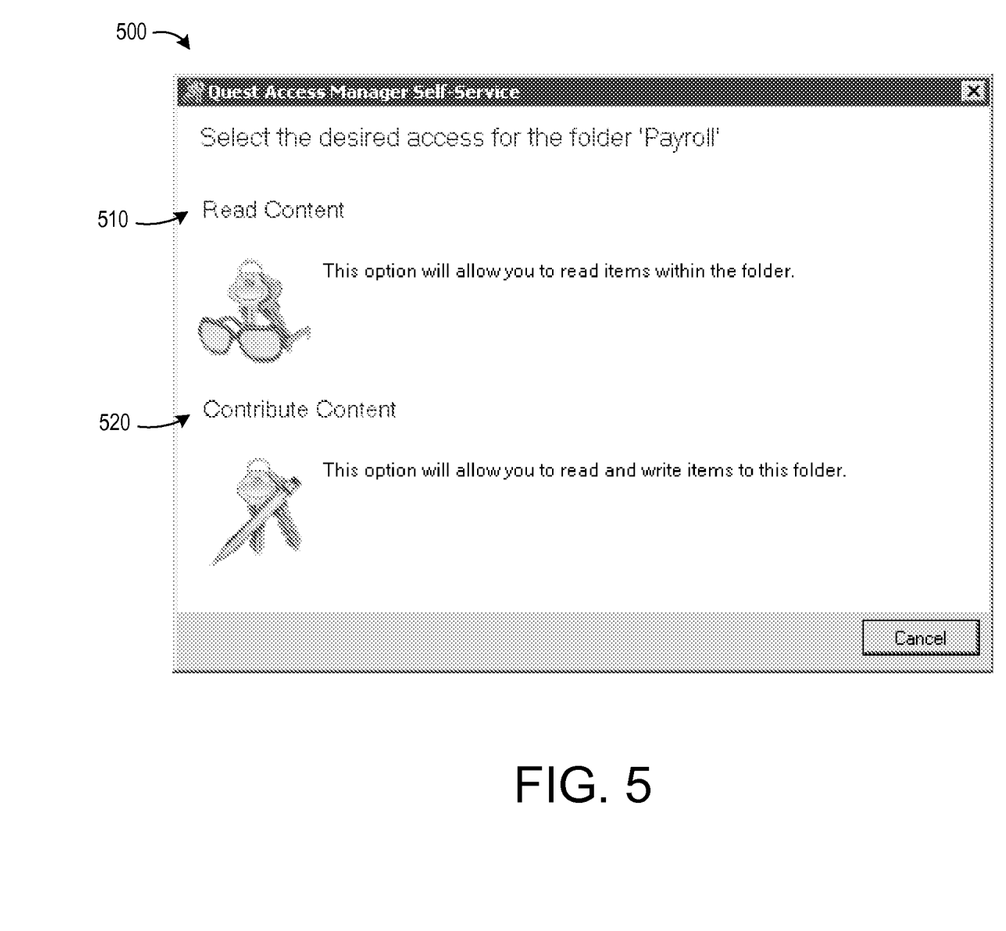

Referring to FIG. 5, an example self-service user interface 500 is shown that may be displayed by the self-service client 103 upon user selection of the request access menu item 430 in FIG. 4. The self-service user interface 500 provides access options 510, 520 for indicating a type of access the user desires to have for the resource 410. Two example types of access options are shown: a read access option 510 and a contribute content (or write) access option 520. Although not shown, other access options can be displayed as well, such as full control, change permissions, or the like. Selection of one of the access options 510, 520 can cause the self-service client 103 to transmit information regarding the requested resource and the desired access rights to the self-service system 104.

Referring again to FIG. 2A, at block 206, the group identifier module 108 of the self-service system 104 identifies groups that have access to the resource. Such groups can include local groups or domain local groups, global groups, universal groups, or the like. As described above, the group identifier module 108 can access the resource's security descriptor 110. This security descriptor 110 can include an access control list (ACL) in one embodiment. An example of an ACL is the discretionary ACL or DACL used in Active Directory, which includes a list of user accounts, groups, and computers that are allowed (or denied) access to a given resource 106. The ACL can include security identifiers (SIDs) of the groups or users that have access to the resource 106 as well as a description of the rights granted, such as read, write, full control, change permissions, no access, or the like.

In certain embodiments, the group identifier module 108 can open the security descriptor 110 of the resource 106 and examine the trustee of each ACL in the security descriptor 110. In one embodiment, the group identifier module 108 determines the type of each of the trustees and discards any trustee that is not a domain level group as being invalid. Additionally, a resource may have multiple ACLS. The group identifier module 108 can evaluate the access rights of each ACL and pass on those ACLS that grant at least the requested rights for further processing.

The group identifier module 108 can also expand the number of available groups. For instance, the group identifier module 108 can expand the group membership of each identified group in an ACL to identify additional nested groups. Any group objects contained within the root group can be captured and passed on, along with the root group itself.

The group identifier module 108 determines at decision block 208 whether any groups are available for the user to join. If no groups have access to the resource listed in the security descriptor 110, no groups are available. In addition, determining availability can include accessing the groups data repository 117 to determine whether the listed groups on the security descriptor 110 are public (e.g., published in a directory service) or private (e.g., nonpublished). In one embodiment, private groups are unavailable or ineligible for users to join, or alternatively, may be less favored (see description below with respect to FIG. 3). In one embodiment, groups can be published in a directory service (such as Active Directory) using a system such as Active Roles Server™, available from Quest Software of Aliso Viejo, Calif.

If no groups were available at block 208, the process 200 proceeds to block 210, where the self-service system 104 either denies the request or performs remediation. Remediation can include creating a new group that meets the requested access rights of the user. The self-service system 104 may require the permission of a system administrator before the new group is actually created or before the user is given access to the new group. Remediation can also include granting the user rights directly to the resource, without being a member of a group.

If one or more groups were available, these groups become candidate groups for user selection. At block 212 the suitability calculator 114 calculates the suitability of the candidate groups based on one or more suitability factors or selection rules. These suitability factors are described in greater detail below with respect to FIG. 3. Advantageously, in certain embodiments, the analysis of suitability factors by the suitability calculator 114 can alleviate a system administrator's burden of manually preconfiguring the types of groups that users can self-join. Instead, in certain embodiments, the suitability calculator 114 can analyze any existing group as a potential candidate for the user to join.

At decision block 214, the suitability calculator 114 determines whether any suitable groups exist. If none were found, the process 200 again proceeds to block 210. Otherwise, the process 200 proceeds to block 215 in FIG. 2B. At block 215, the suitability calculator 114 determines who chooses the group—the user requesting access to the resource (the requestor) or the owner/administrator of the resource. The suitability calculator 114 can be configured to allow either the requestor or the group owner/admin to choose from the one or more suitable groups. Alternatively, the suitability calculator 114 may be configured to allow only requestors to choose groups or only group owner/administers to choose groups for each user.

If the requestor chooses the group, the recommendation module 116 presents one or more of the suitable groups to the user for selection at block 216. The recommendation module 116 can present all the groups identified by the suitability calculator 114 or a subset thereof based on, for example, the degree of suitability of the groups analyzed.

Figure 7A:
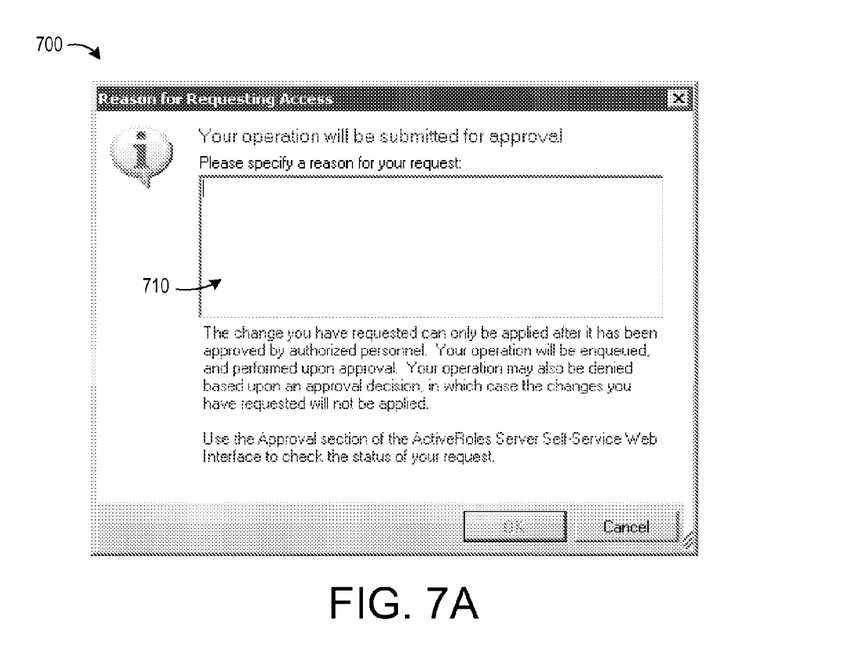
Figure 7B:
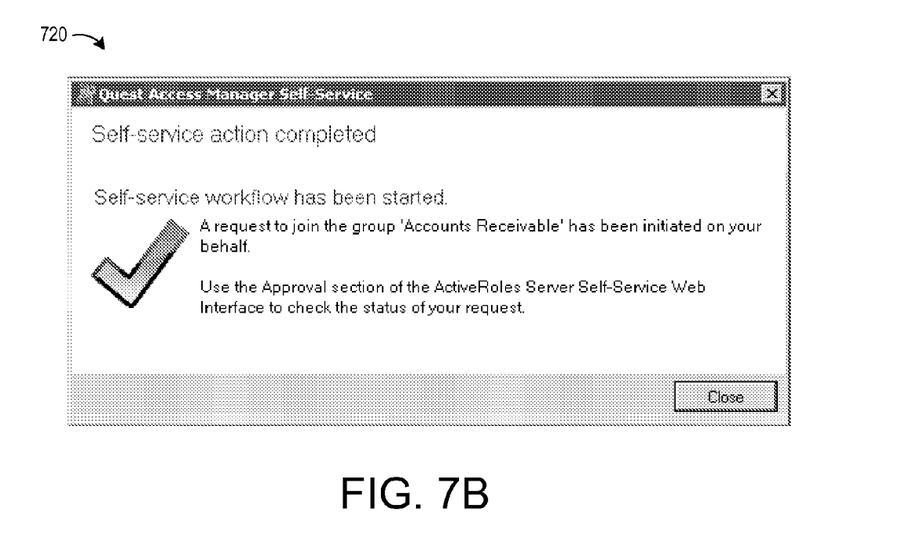

An example user interface 600 for presenting groups to users, which can be generated by the recommendation module 116, is shown in FIG. 6. Referring to FIG. 6, the user interface 600 lists groups 610-630 for the user to join. The user can select a group 610-630 by clicking on the group name or icon, for instance. Upon user selection of a group 610-630, another user interface 700 can be presented to the user, as shown in FIG. 7A. The user interface 700 provides a text box 710 for the user to describe a reason for requesting access to the selected group. This reason can be transmitted to an administrator for approval, but providing a reason may be optional in some implementations. Upon submission of the reason, a confirmation message such as is shown in the dialog box 720 FIG. 7B can be output to the user. The dialog box 720 indicates that the user's request to join a group has been received and that a self-service workflow has been started. This self-service workflow can be an administrative workflow for an administrator to approve the user's group selection. The user interfaces 700, 720 can also be generated by the recommendation module 116.

Figure 8:
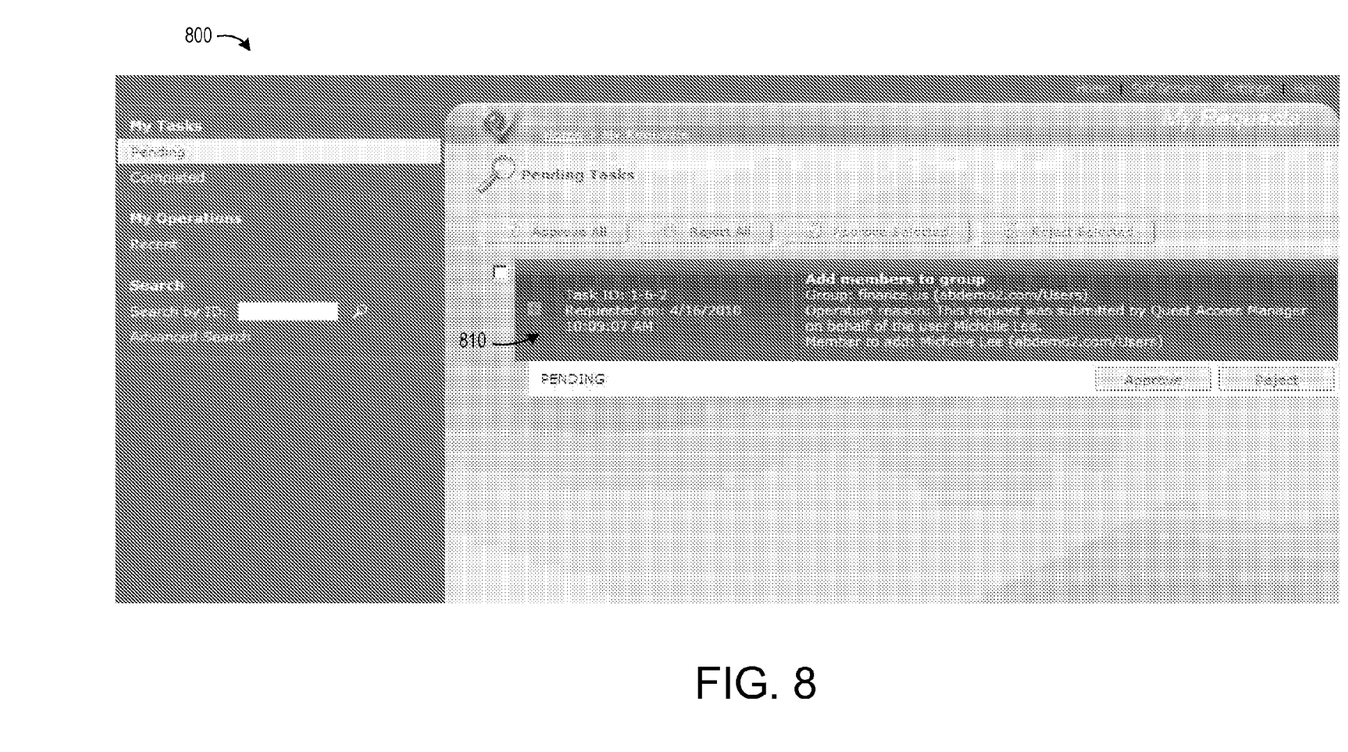

Referring again to FIG. 2B, the management console 118 receives the user's selection at block 218. In response to receiving this message, the management console 118 can send a notification of the user's request to join the group to an administrator of the group for approval at block 220. This notification can be an email, web page update, combinations of the same or the like. In one embodiment, the administrator's approval is optional. FIG. 8 illustrates an example management console 800 including a notification 810 of a user's request to join a group.

It should be noted that the user interfaces in FIGS. 4-8 merely illustrate examples of user interfaces that can be generated by the self-service client 103 and the self-service system 104 and may be varied considerably in other implementations.

Referring again to FIG. 2B, if the suitability calculator 114 is configured to allow group owner or administrator selects the available groups, at block 222 the management console 118 presents the one or more suitable groups to the owner/admin. At block 224, the management console 118 receives the owner/admin group selection, and at block 226, sends notification to the user of the group selection.

It should be noted that in some embodiments, resource owners or administrators can also initiate access requests for users. Thus, the process 200 could be implemented at block 202 (FIG. 2A) by an owner/administrator requesting access to a resource on behalf of a user. Further, if a resource owner or administrator wishes to grant a user access to a resource, or if suitable groups are not available, the resource owner may bypass the self-service group identification process and create a group for the user that includes the desired access traits. The resource owner/administrator may also directly assign the user access to the resource, e.g., on the resource's ACL.

IV. Example Group Identification Features

Figure 3:
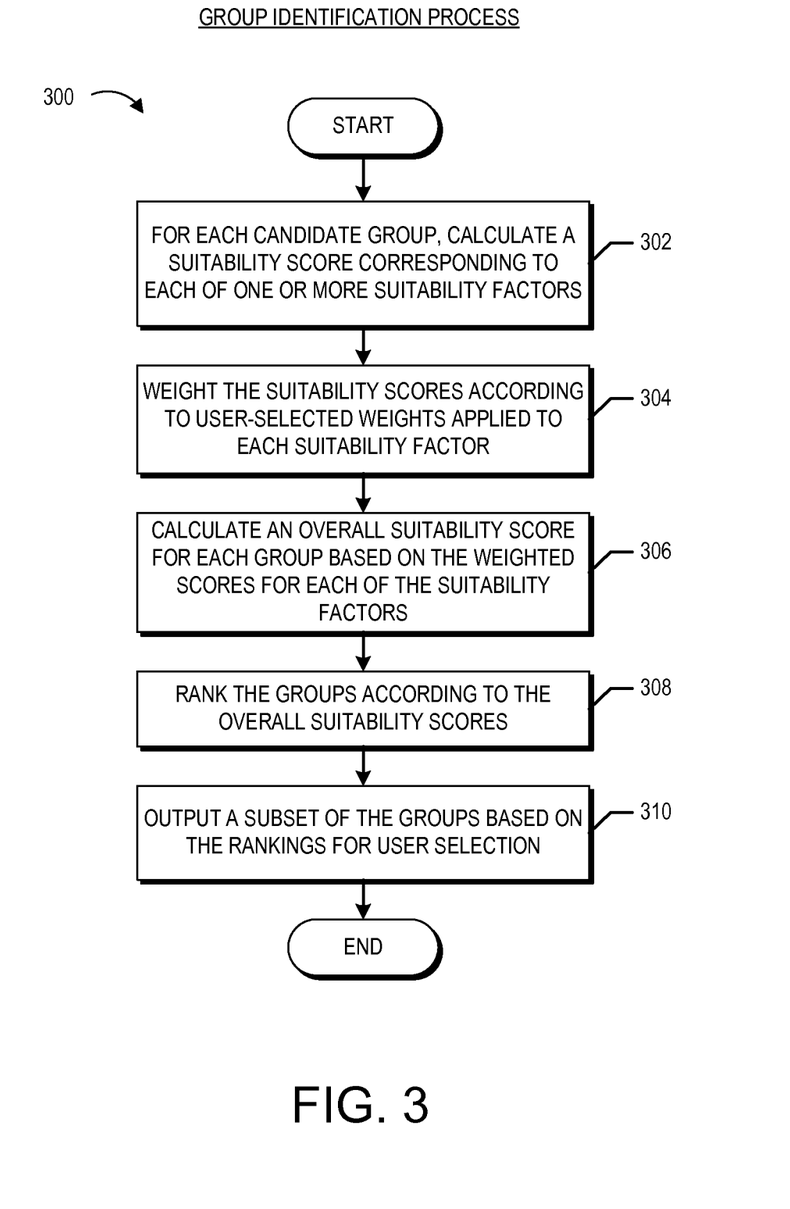
FIG. 3 illustrates an embodiment of a group identification process that can also be implemented by the self-service system of FIG. 1.

FIG. 3 illustrates an example group identification process 300, which is a more detailed embodiment of the suitability calculation block 212 described above. The group identification process 300 can automatically identify groups that are suitable for users based on the user's desired levels of access and based on preferred group characteristics, among possibly other factors. For illustrative purposes, the process 300 will be described with reference to the components of the system 100 of FIG. 1.

As shown, the process 300 begins at block 302, where the suitability calculator 114 calculates a suitability score for each candidate group identified by the process 200 at blocks 206 and 208. The suitability score can reflect the suitability of each group for the user to join and can be determined based on one or more suitability factors (example factors described below) or selection rules.

By way of overview, the suitability calculator 114 can perform one or more calculations for each available group to determine its suitability score or index. For example, for each candidate group, the suitability calculator 114 can perform a series of suitability calculations based on one or more suitability factors to generate suitability subscores for each factor. The suitability calculator 114 can combine the subscores for the various factors to produce an overall suitability score for each group (see block 306, described below). The overall suitability scores can reflect a degree of a candidate group's suitability for a requesting user to join.

In various implementations, the suitability calculator 114 can analyze relatively few or relatively many types of suitability factors or selection rules. Suitability factors can be categorized as requested access rights, group characteristics, and user characteristics. Some examples of requested access rights suitability factors include the actual access rights requested and access inheritance. Groups characteristics can include, among others, group type, group domain, a group's nesting distance from a resource, membership characteristics of a group, the number of resources a group has access to, how often a group is modified, whether the group is published, and the like. Further, the user's characteristics can include the type of user requesting access. Each of these factors will be discussed in turn. Description of an example scoring system follows the description of the example suitability factors.

Regarding access rights, the suitability calculator 114 can determine whether the rights held by a candidate group match the rights requested. If the group holds more rights than were requested, then the suitability calculator 114 might consider the group to be not as good of a fit for the user as another group that holds exactly the rights requested. This can be particularly true if the rights available to the group exceed the requested rights, although groups with fewer rights can also be considered to be less suitable. In one embodiment, groups that allow full control or allow permissions to be changed may also be considered less suitable, even if a user requests such rights.

Access inheritance is a related factor to access rights. The suitability calculator 114 can determine whether the rights held by a candidate group are explicit or inherited. The suitability calculator 114 can consider explicit rights to be preferable to inherited rights because if the access rights of the object from which the rights are inherited changes, the rights of the candidate group can also change.

The suitability calculator 114 can analyze many different types of group characteristics, such as the type of a group as a suitability factor. In Active Directory or similar systems, global groups may be more desirable to add users to than universal groups and domain local groups. Universal groups may also be favored over domain local groups. Built in groups are least favored in one embodiment, and in another embodiment are entirely disregarded. As described above, in Active Directory, a domain local group is typically directly assigned the rights for a resource and global groups of users are nested in the domain local group to obtain access to the resource. Thus, a global group can be more suitable for a user to join than domain local groups. Universal groups are often used in place of global groups and are similarly more preferable than domain local groups in certain implementations. For directory services other than Active Directory, the suitability calculator 114 may assign greater suitability scores to different group types than those described herein.

The suitability calculator 114 can also consider a group's domain as a suitability factor. The suitability calculator 114 can favor groups in the same domain as the requesting user to be more favorable than groups outside of the user's domain. Another possible factor is a group's nesting distance from a resource. In one embodiment, the suitability calculator 114 assigns lower suitability scores for groups that are nested, such as more than two nestings away from the resource. In contrast, the suitability calculator 114 can assign higher suitability scores for groups that are fewer nestings away from the resource (or that are not nested at all). Conceptually, the farther away a group is from having direct access rights to the resource, the less suitable a group may be due to having possibly broader scope than the requested access.

The membership characteristics of a group are additional factors that the suitability calculator 114 can evaluate. For instance, the more members that a group has in one embodiment, the more desirable or suitable the group can be, since groups with fewer members are often tightly controlled. An owner of a tightly-controlled group might be less willing to approve the access request. The suitability calculator 114 can also evaluate the number of resources a group has access to. In one embodiment, groups that are more prolific (e.g., have access to more resources) can pose greater security risks and may therefore be less favored.

Additional group characteristics that the suitability calculator 114 can evaluate include how often a group is modified and whether the group is published. Candidate groups that are modified often are more likely to be appropriate than those which are infrequently manipulated. Groups that are published can be more desirable than groups that are unpublished. Unpublished groups may be unpublished by their owners for the very reason that the owners do not want others to join their groups. Moreover, whether a group has an owner is another potential factor that the suitability calculator 114 can consider. In one embodiment, groups without owners may not have a mechanism to approve a self-service request and are therefore undesirable or less desirable (and may be a last resort in one embodiment). Further, groups that group owners or administrators have indicated are important or restricted (e.g., on the ACL or in some other metadata) are likely more stringently controlled and may therefore be less favored in some embodiments.

In addition to access rights and group characteristics, the suitability calculator 114 can also evaluate one or more characteristics of the user requesting access. The type of user requesting access is one possible characteristic that may be considered. For instance, the suitability calculator 114 may relax the suitability factors for a user that is an executive or c-level employee (such as the CEO, CFO, COO, or the like). It may be less important to exclude such a user from a group that has more access rights than requested, for instance, because such a user may have significant authority in an organization. Similarly, users that report to executive or c-level employees may also be considered to have relatively high authority and can be treated like executives or c-level employees for grouping purposes.

Moreover, the suitability calculator 114 can also evaluate the characteristics of the resource itself to evaluate whether to allow a user to access the resource. Some resources may be secret, classified, or otherwise more restricted than other resources. Such resource characteristics can be indicated in metadata associated with the resources (e.g., on the ACL, in a central repository, or the like). Users and/or groups that have characteristics matching or exceeding the characteristics of the resource may be granted access. Thus, for example, a user requesting access may have top secret clearance and therefore may be allowed to join a group that has top secret clearance for accessing a classified resource. Groups other than the top secret-cleared groups may be considered unsuitable for recommending to this user. Further, the self-service system 104 may deny access to users that do not have the clearance or other characteristic(s) that match with a particular resource.

The suitability calculator 114 can use any scoring scheme to evaluate and score each factor considered. The following example scoring system is described for illustrative purposes. In this example, the suitability calculator 114 evaluates a suitability subscore for each suitability factor. The subscore can includes one of the following integer values: Very Good (+2), Good (+1), Neutral (0), Bad (−1), and Very Bad (−2). Of course, these values are merely examples and are used herein for purposes of illustration.

For example, in applying the above suitability factors, the suitability calculator 114 can determine the following. If a group's access to a resource is exactly what was requested, that can be considered "very good" (+2). On the other hand, if the group's access to the resource is "full control," that can be considered "very bad" (−2) Otherwise, the result can be considered "neutral" unless: (i) the request was for "read" access and the group has any "change" bits (e.g., "bad"); or (ii) if the group has the "change permissions" access right, the suitability calculator 114 may lower the suitability score one level (i.e., "neutral" becomes "bad," "bad" becomes "very bad," etc.).

Regarding various group characteristics, if a group is in the same domain as the resource 106, the group can be considered to be "very good." If the group has direct (non-nested) access to the resource 106, it can be considered "very good." If the group is one nesting step away from the resource 106, it can be considered "good." If the group is two steps away from the resource 106, it can be considered "neutral." If the group is more than two steps from the resource 106, it can be considered "bad." In certain embodiments, if the group is a global group, it is considered "very good." If the group is a universal group, it can be considered "good." If the group is a domain local group, it can be considered "bad." If the group is a built-in, it can be considered "very bad." If a group is published, it can be considered "very good." If the group is unpublished but does not require any approval for access requests, it can be considered "good." If the group requires approval by one or more owners, the group can be considered "bad."

With continued reference to FIG. 2, some administrators might wish to customize the predetermined scoring scales used by the suitability calculator 114, for example, by giving greater weight to certain factors. Thus, the suitability scores are weighted at block 304 according to user-selected weights applied to each suitability factor. The suitability calculator 114 can provide a user interface, for example, that allows an administrator to specify a weight to be applied to one or more factors. The user interface can include text boxes that allow users to specify numerical weightings, sliders that allow a user to graphically adjust weightings, combinations of the same, or the like.

Multiple weights can be assigned to each suitability factor. For instance, the suitability calculator 114 can allow users to specify a positive and negative weighting to be applied to one or more factors. Having separate weightings can allow users to emphasize positive or negative aspects of a suitability factor. In this way, a user can mark particular criteria as having a more important negative impact, while at the same time not affecting its positive impact (and vice versa). Additionally, by providing a multiplier of "0" for either the positive or negative multipliers can negate that criteria's impact on the final calculation. In one embodiment, the suitability calculator 114 assigns baseline weights that are user-adjustable. The user adjustment of the weightings can advantageously allow for the modification at runtime of the applicability of each suitability factor.

At block 306, the suitability calculator 114 calculates an overall suitability score for each candidate group based on the weighted suitability subscores for each of the suitability factors. The suitability calculator 114 can, for instance, sum, average, or otherwise combine the weighted suitability subscores to produce the overall suitability score. The suitability calculator 114 can rank the candidate groups according to their overall suitability scores at block 308. At block 310, the suitability calculator 114 can output a subset of the groups for user selection based on the groups' rankings. For instance, in one embodiment, the suitability calculator 114 applies a threshold score which groups must meet in order to be recommended to a user by the recommendation module 116.

V. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of automatically identifying suitable groups for a user to join and thereby gain access to a network resource, the method comprising:

receiving a request from a user to obtain access to a network resource for which the user does not currently have access, the request comprising a requested level of access for accessing the network resource;

identifying available groups that have access to the network resource;

computing a suitability of each of the available groups based at least partly on the requested level of access rights and on one or more characteristics of the available groups;

recommending one or more of the available groups to the user as one or more suitable groups based on the computed suitability for the one or more available groups, thereby making the one or more suitable groups available for the user to join, enabling the user to obtain access to the network resource;

receiving a user selection of one of the one or more available groups from the user; and submitting the user selection to an administrator for approval;

wherein at least said computing is implemented by a computer system comprising computer hardware.

2. The method of claim 1, wherein said computing the suitability comprises calculating a relatively higher suitability score if a selected one of the available groups has access rights matching the requested level of access rights and computing a relatively lower suitability score if the access rights do not match the requested level of access rights.

3. The method of claim 2, wherein said computing the suitability comprises calculating a relatively lower suitability score if a selected one of the available groups has access rights that are inherited from another group and computing a relatively higher suitability score if the access rights are not inherited.

4. The method of claim 1, wherein said computing the suitability comprises scoring the available groups based on the access rights held by each of the available groups and based on the one or more characteristics of the available groups.

5. The method of claim 4, further comprising applying user-determined weightings to scores obtained by computing the suitability.

6. The method of claim 1, wherein said computing the suitability of each of the available groups further comprises computing the suitability based further on a type of the user that is requesting access to the network resource.

7. The method of claim 1, wherein the network resource comprises one of the following: a computing system, a peripheral, a document, a mailbox, a calendar, an application, a folder, a directory, and a file.

8. Non-transitory physical computer storage comprising instructions stored thereon for implementing, in one or more processors, a method of automatically identifying suitable groups for a user to join and thereby gain access to a network resource, the method comprising:

receiving a request for access to a network resource for which a user does not currently have access;

identifying available groups that have access to the network resource;

computing a suitability of each of the available groups based on one or more suitability factors, the one or more suitability factors reflecting one or more of the following: access rights held by the available groups, one or more characteristics of the available groups, one or more characteristics of the resource, and one or more characteristics of the user;

outputting one or more of the available groups as one or more suitable groups based on the computed suitability for the one or more available groups; and wherein said outputting comprises making the one or more suitable groups available for selection by the user.

9. The non-transitory physical computer storage of claim 8, wherein said identifying the available groups comprises accessing a security descriptor of the network resource.

10. The non-transitory physical computer storage of claim 8, wherein the one or more characteristics of the available groups comprise a type of the available groups.

11. The non-transitory physical computer storage of claim 8, wherein the one or more characteristics of the available groups comprise a domain of the available groups.

12. The non-transitory physical computer storage of claim 8, wherein the one or more characteristics of the available groups comprise a number of users of the available groups.

13. The non-transitory physical computer storage of claim 8, wherein the one or more characteristics of the available groups comprise a nesting distance of the available groups from the resource.

14. The non-transitory physical computer storage of claim 8, wherein the one or more characteristics of the available groups comprise a number of resources to which the available groups have access.

15. The non-transitory physical computer storage of claim 8, wherein said outputting comprises making the one or more suitable groups available for selection by an administrator.

16. A system for automatically identifying suitable groups for a user to join and thereby gain access to a network resource, the system comprising:

a group identifier module configured to receive a request for access to a network resource for which a user does not currently have access and to identify available groups that have access to the network resource;

a suitability calculator implemented by a computer system comprising computer hardware, the suitability calculator configured to compute a suitability of each of the available groups based on one or more suitability factors, the one or more suitability factors reflecting one or more of the following: access rights held by the available groups, one or more characteristics of the available groups, and one or more characteristics of the user;

a recommendation module configured to output one or more of the available groups as one or more suitable groups based on the computed suitability for the one or more available groups; and wherein the recommendation module is further configured to receive a user selection of one of the one or more suitable groups from the user.

17. The system of claim 16, further comprising a management console configured to report the user selection to an administrator for approval.

18. The system of claim 16, wherein the one or more characteristics of the available groups comprises one or more of the following: a type of the available groups, a domain of the available groups, a nesting distance of the available groups from the resource, a number of resources to which the available groups have access, and publication status of the available groups.

* * * * *